(12) United States Patent
Cook et al.

(10) Patent No.: US 7,203,758 B2
(45) Date of Patent: Apr. 10, 2007

(54) SYSTEM AND METHOD FOR SELECTIVE INSERTION OF CONTENT INTO STREAMING MEDIA

(75) Inventors: David H. Cook, Seattle, WA (US); Gregory D. Anderson, Redondo Beach, CA (US)

(73) Assignee: Loudeye Technologies, Inc., Seattle, WA (US)

( * ) Notice: Subject to any disclaimer, the term of this patent is extended or adjusted under 35 U.S.C. 154(b) by 727 days.

(21) Appl. No.: 10/047,511

(22) Filed: Oct. 19, 2001

(65) Prior Publication Data

US 2003/0018966 A1    Jan. 23, 2003

Related U.S. Application Data

(60) Provisional application No. 60/241,678, filed on Oct. 19, 2000.

(51) Int. Cl.
*G06F 15/16* (2006.01)
(52) U.S. Cl. .................. 709/231; 709/203; 709/217; 709/246
(58) Field of Classification Search ............ 709/231; 725/35, 36, 93
See application file for complete search history.

(56) References Cited

U.S. PATENT DOCUMENTS

| | | | |
|---|---|---|---|
| 5,778,187 A | | 7/1998 | Monteiro et al. |
| 5,996,015 A | | 11/1999 | Day et al. |
| 6,094,677 A | * | 7/2000 | Capek et al. ............ 709/219 |
| 6,317,761 B1 | | 11/2001 | Landsman et al. |
| 6,487,721 B1 | * | 11/2002 | Safadi ............ 725/36 |
| 6,505,169 B1 | * | 1/2003 | Bhagavath et al. ........... 705/14 |
| 6,615,039 B1 | * | 9/2003 | Eldering ............ 455/418 |
| 6,684,249 B1 | * | 1/2004 | Frerichs et al. ............ 709/225 |
| 6,701,355 B1 | * | 3/2004 | Brandt et al. ............ 709/219 |
| 6,704,930 B1 | * | 3/2004 | Eldering et al. ............ 725/36 |
| 6,771,644 B1 | * | 8/2004 | Brassil et al. ............ 370/390 |
| 6,820,277 B1 | * | 11/2004 | Eldering et al. ............ 725/35 |
| 6,834,308 B1 | * | 12/2004 | Ikezoye et al. ............ 709/231 |

OTHER PUBLICATIONS

Brassil et al. "Program insertion in real-time IP multicasts." Apr. 1999. ACM SIGCOMM Computer Communication Review, vol. 29, Issue 2, pp. 49-68.*

International Search Report, PCT/US01/51416, Oct. 19, 2001.

* cited by examiner

*Primary Examiner*—Rupal Dharia
*Assistant Examiner*—Nicholas R. Taylor
(74) *Attorney, Agent, or Firm*—Paul, Hastings, Janofsky & Walker LLP (57) ABSTRACT

Method and system for server side insertion of rich content into a media stream uses an insertion plugin to redirect users' requests for streaming media through a server, and operates on either live broadcasts or on demand playlists. The live broadcast identifies impending local interrupt breaks and seamlessly inserts content chosen to match user attributes. The on demand implementation broadcasts a playlist of encoded content including predetermined file content and additional rich content inserted based on user attributes as selected by a decision engine. The insertion of content can be performed on already encoded media. In one embodiment, time matching is performed to avoid rebuffering.

13 Claims, 11 Drawing Sheets

SYSTEM AND METHOD FOR SELECTIVE INSERTION OF CONTENT INTO STREAMING MEDIA

RELATED APPLICATIONS

This application is related to and claims priority from U.S. patent application Ser. No. 60/241,678, filed Oct. 19, 2000, entitled SYSTEM AND METHOD FOR INSERTING DESIRED CONTENT INTO STREAMING MEDIA, which is incorporated herein by reference.

FIELD OF THE INVENTION

The present invention relates to systems and method for handling streaming media, and more particularly relates to systems and methods for selective server-side insertion of rich media content into live and on-demand multimedia data streams.

BACKGROUND OF THE INVENTION

Broadcast media has, for decades, been the advertising media of choice for most companies. However, between the proliferation of cable TV and the Internet, audiences are fragmenting. Each year, broadcast television and related conventional broadcast media reach a smaller and smaller fraction of the total target audience for any given market segment. The explosion of the internet has grown to the point that there are now hundreds or thousands of terrestrial radio stations, and hundreds of internet only radio stations, streaming their content onto the internet everyday.

As broadband and fast wireless internet access becomes ubiquitous, the demand for online audio and video rich content increases similarly. Rich media content, including rich advertising or other information, provides an opportunity for advertisers and others to reach a significant share of the target market that has drifted away from broadcast television. Internet-based rich media incorporates the high impact and retention properties of TV and radio broadcasts, combined with the captive audience and individualized nature of the personal computer, or PC. By inserting targeted rich content into other streaming media, advertisements and other selected information can be easily and effectively provided to those most likely to be interested in the message presented.

Prior efforts to provide targeted rich media have generally suffered from a number of limitations. In general, prior art solutions have operated only with streaming audio, rather than multiple media (such as audio and video combined.) A typical prior art configuration for streaming includes some type of automation system (a system that plays a list of tracks) which plays the music and advertisements for the radio station. The output of this automation system is often an analog signal, which is connected to the audio input of a sound card on a machine which acts as an encoder. The encoder then compresses the audio and outputs compressed packets to a server, from which the compressed packets are distributed over the internet. Clients connect to the server and listen to the broadcast. In this original architecture, broadcasters would either host their own servers, or would collocate the servers at a high quality Internet Service Provider (ISP) in order to provide the bandwidth needed to service the users. The clients were generally PC's which have software for playing streaming media.

More recently, the need to use bandwidth more efficiently, and to improve performance, has led to the development of hosting providers, often referred to as Content Delivery Networks (CDN's), with servers located at the edge of the network. In such an arrangement, the hosting providers have servers spread throughout the United States and throughout the world. The signal is typically broadcast as a multicast signal over a backbone to the servers which are located near the edge where the users connect. Typically, the broadcast is reconfigured as a unicast stream at that point, and the users connect to the unicast servers. Typical hosting providers of this type include Qwest, Akamai, IBeam, and Enron, as examples.

Recently, wireless internet connections capable of handling streaming media have been introduced, although the data rates for such devices remain limited at present. Broadcasts over wireless connections are typically two-way and connection oriented, rather than multi-cast connections.

Typical prior art clients for streaming media are primarily PC's, but may also be Personal Digital Assistants (PDA's), some cell phones, network-connected stereo systems, and network connected car radio devices.

In the past, a variety of techniques have been proposed for inserting advertisements into streaming media. In conventional internet broadcasts, the insertion system relies on signals from the automation system to advise when a break will occur in the streaming media of the broadcast. That information, although it does not occur at precise intervals, is typically timetagged and tied to the media stream—for example, in a live radio broadcast, the disc jockey is given a range during which he is to go to a commercial break, but that actual choice of exactly when within that range is up to him. Once he decides, the automation system generates a time-tagged signal which can be recognized by other external devices. The insertion system typically detects the signal from the automation system and responds to it by first deciding what advertisement to insert and then implementing the actual insertion. However, many conventional insertion systems typically insert the advertisement prior to the encoder. This causes all clients to receive the same advertisement, which limits the utility of the insertion process because the advertisements are not targeted, or correlated to the interests of the listener.

In another prior art technique, the advertisements are inserted into the streaming media servers at the point at which the multicast signal is received, but before the edge servers rebroadcast the streaming media to the clients. This arrangement is typically implemented as a plug-in for the streaming media edge server. This approach offers only limited targeting in that every listener associated with a single edge server receives the same advertisement—or what is roughly geographic location based targeting.

A further prior art technique involves insertion of the advertisement at the client itself. In this case, special client software is typically required to be resident on the client machine, and advertisements are typically "trickled down" to the client (downloaded onto the client in the background using limited bandwidth) and cached at the client itself. Then, when an ad insertion signal is detected, the ad is pulled from the client cache and inserted locally. This technique creates numerous limitations, not the least of which is the use of client storage as well as the security risk associated with storing the inserted content locally at the client.

As a result, there has been a need for an information insertion technique which allows user-specific targeting, provides for good security of the content without requiring local caching, offers ease of use and maintenance, and does not require special client-side downloads.

SUMMARY OF THE INVENTION

The system and method of the present invention includes a server-side plugin for the streaming media server which located between the source stream and the client, or what may alternatively be thought of as being between the edge server and the rebroadcast data stream. By locating the plug-in at the server side, but downstream of the edge server, client-specific information can be inserted into the streaming media, thereby providing excellent targeting.

In addition, the positioning of plug-in at the streaming media server side minimizes the engineering effort required to support and maintain this system. In addition, the system of the present invention supports all possible streaming clients, since the native stream at the output of the server plug-in is simply a normal data stream with the rich information inserted.

Moreover, the present invention offers excellent security to the host because the non-inserted data remains on the host at all times. Furthermore, the servers may be configured such that the source content (either live broadcast streams or on-demand files) is not accessible to users except through the Insertion Plugins. In addition, the insertion system for the present invention works with all native players of the relevant content, without requiring special downloads at the client site. Since the data stream of the original content and the newly inserted content is an unbroken stream, client players will not rebuffer between the pre-existing content and the inserted content. Further, the security of the inserted content is high since it remains on the streaming media server until inserted into the data stream by virtue of the plug-in. As a result, the content to be inserted cannot be tampered with by external users. Further, the system is highly scalable, although the number of streams capable of being handled by a single server may vary depending on the granularity of the targeting.

Additionally, the invention provides the capability of accurately measuring the volume of consumers to whom content is being delivered, and the basis for affidavit reporting on advertising delivery. Further, the dynamic nature of the insertion capability of the present invention allows advertisers to monitor response to copy, run split copy campaigns and tweak the copy to maximize the ROI on advertising campaigns. The invention also includes techniques for eliminating rebuffering or other gaps in the delivery of the content to the user by matching the length of the inserted content and the length of the break, resulting in a richer experience for the user.

The foregoing summary of the invention will be better understood from the following Detailed Description of the Invention, taken together with the appended Figures.

DETAILED DESCRIPTION OF THE INVENTION

Figure 1:
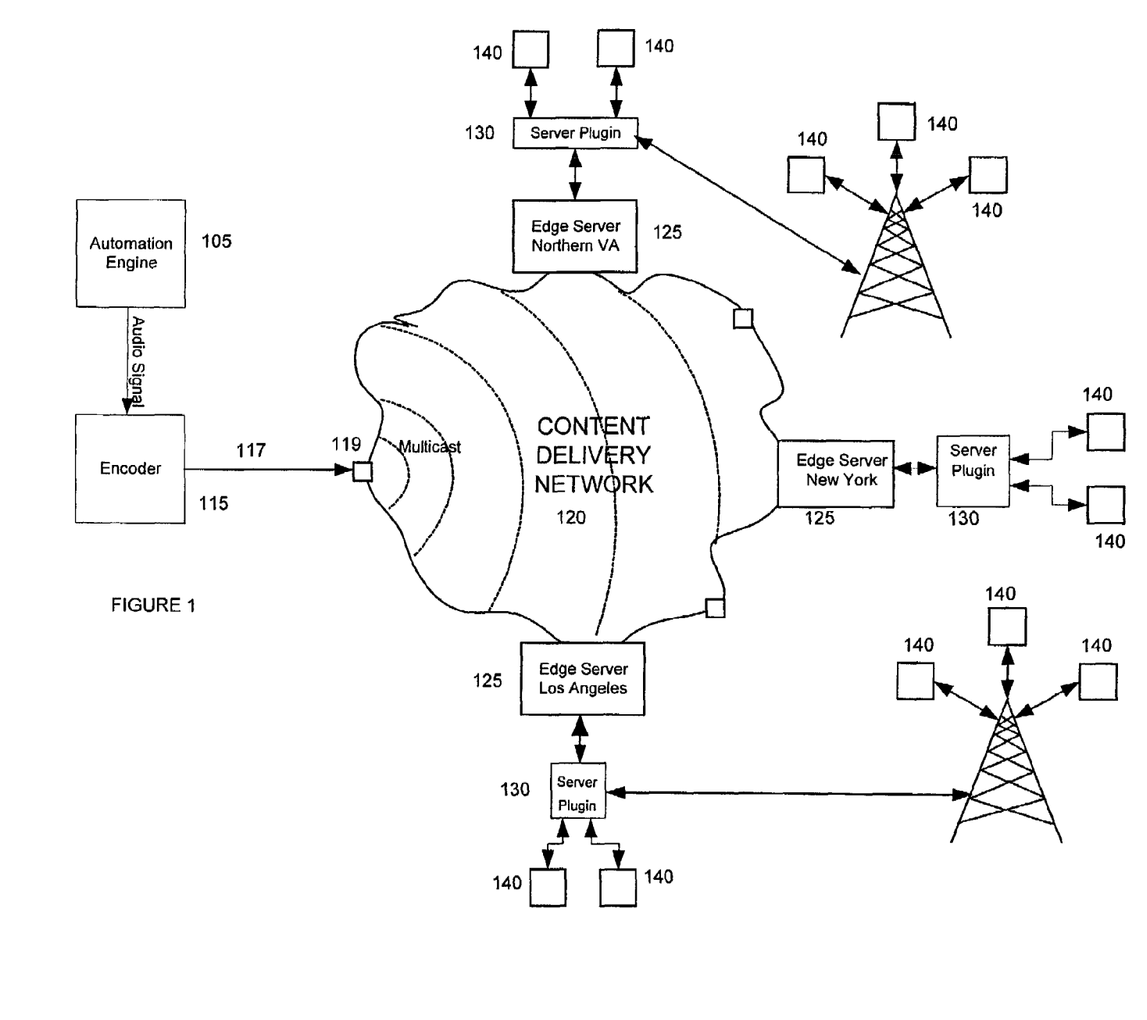
FIG. 1 illustrates in system diagram form an overall view of the system of the present invention.

Referring first to FIG. 1, an overall view of a system in accordance with the present invention may be better appreciated. In particular, a system 100 in accordance with the present invention includes an automation engine 105 of any conventional type used in the broadcast industry. In the example of FIG. 1, the automation engine 105 essentially plays content, such as a list of tracks. In the example of a radio station doing a live broadcast, the automation engine 105 is under the control of a disc jockey and provides an output signal 110 which may be, for example, an audio signal, which alternatively may be a video signal, or a combined audio and video signal, or other combined streams of multiple media types. For the sake of simplicity, the discussion hereinafter will focus on distribution of an audio signal, although it is to be understood that the implementation may be for any stream of one or more media types. In addition, the automation engine also typically provides a break signal, commonly referred to as local insert break, or LIB, which signals that a LIB is impending. In a typical arrangement, the disc jockey is given a range of times within which to schedule a LIB, although the exact moment of that LIB is a matter of discretion. However, upon determining to take a break from programming, the automation engine causes a signal to be generated slightly in advance of that LIB and delays the actual initiation of the break accordingly.

The output signal 110 is then fed through an encoder 115, which converts the signal 110 into a digital form and packetizes it for distribution over a digital network such as the internet, a local area network, a wide area network, or any other suitable form of network capable of handling digitized audio or video data. In a typical arrangement, the encoder will compress the audio information in any suitable manner, such as MP3 or MPEG, although other approaches will be acceptable in at least some implementations, and will output the content as a streaming media signal 117. In the instance of the internet, the encoder 110 will typically supply the encoded packets to a network access point (NAP) 119 through which access is gained to the internet backbone 120. Although in a preferred arrangement the distribution over the internet is achieved through a multicast protocol, a multicast approach is not required in all instances. For example, a unicast split stream approach may be used; the particular arrangement is not critical to the present invention. In a typical arrangement, however, the content may be distributed at least regionally and more probably nationally or globally, so that users in many locales can receive the content.

In a typical internet implementation, a plurality of edge 125 servers are located on the edges of the backbone 120, which for purposes of the present invention are streaming media servers. Such edge servers are well known within the industry, and may be provided by any of a multitude of service providers including Akamai, iBeam and others. Such edge servers provide a variety of functions, one of which might be conversion of a multicast signal to a unicast signal, if the multicast protocol was used. In addition, also located on as least some of the edge servers is software identified in FIG. 1 as server plug-in 130. Although indicated as a separate structure in FIG. 1, the server plug-in is typically not on a separate server and is shown separate in FIG. 1 only to illustrate the functionality. In an exemplary arrangement, the server plug-in 130 is located on as many edge servers as required to provide downstream users with the service of the present invention. Thus, in the illustrative arrangement of FIG. 1, three edge servers 125 located in Los Angeles, New York and Northern Virginia have been identified although in a typical arrangement there would be many more servers located around the country and each such server might in fact comprise a server farm rather than a single server.

The functions of the server plug-in 130 are described in greater detail hereinafter in connection with FIGS. 2 through 6, and the server plug-in 130 is a key element of the present invention. In simplest terms, the plug-in 130 intercepts the broadcast stream destined for each end user 140 served by the associated server 125 and manages the insertion of the new content for that client. End users 140 may be connected to the edge server through either a wired or wireless connection, as shown by transmission antenna 145. As discussed in greater detail hereinafter, also resident on the edge server 125 (or another proximate server in some embodiments) is the content to be inserted, together with suitable information about the end users by which a correlation can be made between the content available to be inserted and the particular end user. Depending on the desired arrangement, the granularity of such targeting can be resolved down to the individual user, can be resolved only to geographic areas, or can be resolved in accordance with any suitable criteria. Such criteria may include, but is not limited to, age, gender, zip code (or part thereof, telephone number (or part thereof, and preferences which the user has previously specified. From a functional standpoint, the plug-in 130 operates to detect the break signals in the broadcast signal transmitted by the encoder and to insert the rich content into the stream destined for each end user, or client, 140. Such rich content may include, but is not limited to audio, video, Uniform Resource Locators (URL's), animations, or any combination of these types (i.e. audio and video).

Figure 2:
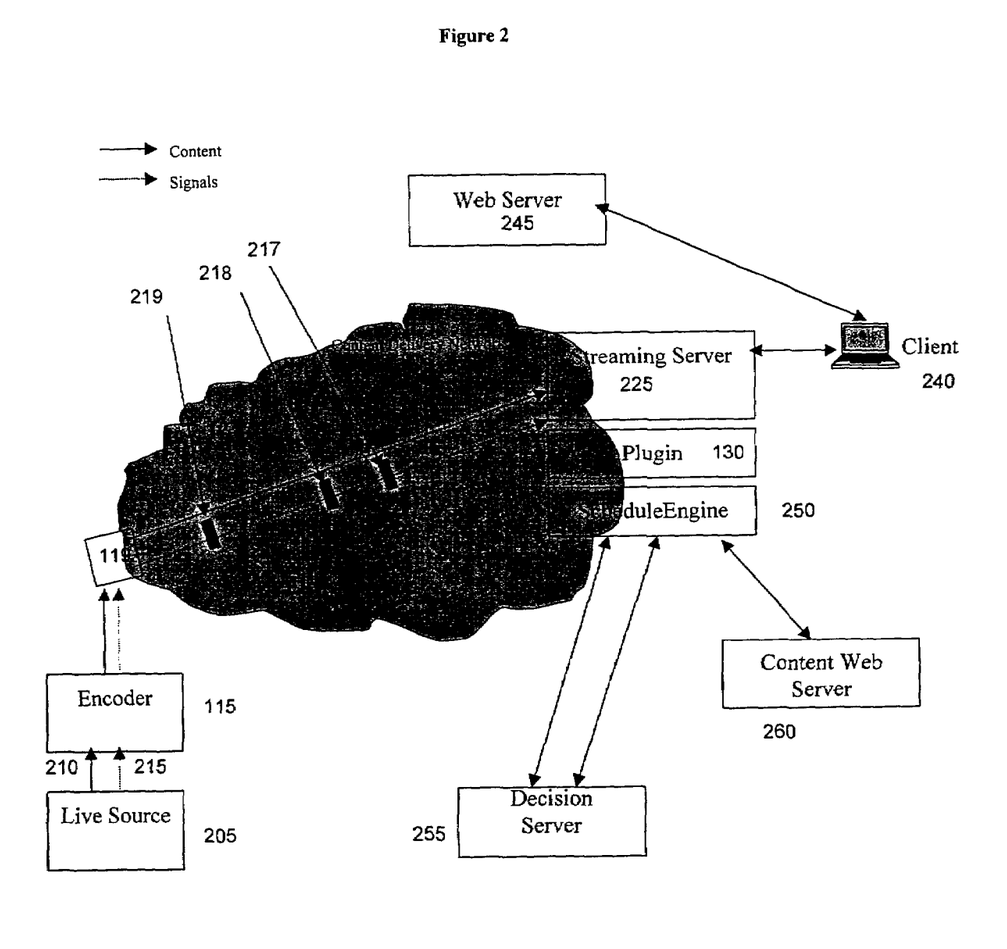
FIG. 2 illustrates in more detailed system diagram form certain aspects of the system and method of the present invention.

While FIG. 1 provides an overall view of the structure of a system in accordance with the present invention, the functional, or software side, of the system may be better appreciated from FIG. 2. In addition, the arrangement of FIG. 2 also illustrates the differences in the manner in which live broadcasts and on demand broadcasts may be handled. As will be appreciated by those skilled in the art, there are two basic scenarios for the use of some or all of the above-described components for server side content insertion. The first scenario is for the case of Live Broadcast of Content and is similar to a normal television or radio station. The Content is generally being encoded in real time as that Content is being generated. Examples of this include but are not limited to internet rebroadcast of traditional radio station signals or traditional television station signals. These also include rebroadcasts by such stations of pre-recorded Content, because such rebroadcasts are typically indistinguishable from a Live Broadcast by the time the broadcast stream appears at the Streaming Servers 125. The second basic scenario illustrated in FIG. 2 is generally referred to as On Demand. In the typical On Demand arrangement, pre-recorded Content resides on or proximate to the streaming server 125 as a local file and, on demand by the client, the streaming server 125 streams the Content to the requesting Client.

Thus, continuing to refer to FIG. 2, a live source 205 will typically be associated with the automation engine 105, and both the content signals 210 and control signals 215, each of will be provided to the encoder 115. It will be appreciated that like elements from FIG. 1 have retained their same reference numerals. In addition, the flow of content in FIG. 2 is illustrated by a solid line, while the flow of control signals is indicated by a dashed line.

The Content 210 may consist of audio, video, static pictures, uniform resource locators (URL's), or any other type of information or combination of information which may be streamed for the customers to view or listen to. The control signals 215 are meta-data which provide information about the Content and the Local Insert Breaks (LIB's), and will typically include signals LIBprepare 217, LIBstart 218 and LIBend 219. The Encoder 115 interfaces to the Live Source and accepts both the Content signal 210 and the control signal 215 and, if not already digitized, digitizes them and then compresses them into a format appropriate for streaming. The combined encoded signals are analogous to the streaming media signal 117 of FIG. 1. As with FIG. 1, the encoder 115 is connected to a network access point 119, or entry point, into the content delivery network 220. Depending on the particular implementation, the content delivery network 220 can be a distributed network of streaming servers 225 (which are generally third party software capable of streaming the encoded content and control signals to clients 240) by, for example, residing on the edge servers 125 of FIG. 1; a Data Center; or a centrally located group of streaming servers. Regardless of the implementation of the network 220, the encoded stream 117 goes to the streaming servers 225. Clients 240 are third party software which typically runs on an end user's desktop computer 140 and connects to the streaming servers 220 to render the encoded content so that the end user 140 running the Client 240 can view or hear the Content 210. In addition, in a typical arrangement, a Web Server 245 is provided such that the Client 240 first connects to the Web Server 245, and the server 245 responds to the client's request by returning web pages which contain links that cause the Client 240 to connect to the Streaming Server and to request a particular Content stream 210. The web server 245 is typically capable of handling metadata.

In order to use the streaming servers 225 to manage content insertion, several more components must introduced into the system. As further shown in FIG. 2, a plug-in 130 is installed on the streaming servers 225. The Insertion Plugin 130 is capable of intercepting the content stream 210 and control signal stream 215, detecting the signals, and inserting additional content such as advertisements into the Content stream 210. Furthermore, the plug-in 130 filters out the control signal stream 215 so that the control signals do not go to the Client 240. A Schedule Engine 250 is an executable module which provides an interface between the Insertion Plugin 130 and an advertising/rich content decision server 255, hereinafter referred to as a decision server. The decision server 255 is typically a software library for supplying the content to be inserted, and may reside physically on the edge server 225 of FIG. 1, or alternatively may reside at any server suitably proximate to allow timely supply of the inserted content. The Schedule Engine 250 accepts asynchronous requests for advertisements or other statically encoded content, makes the request of the decision server 255, takes the results from the server 255, downloads any statically encoded content not already resident on a local disk from one or multiple Content Web Servers 260, and then notifies the Plugin 130 that the content is ready. In a typical arrangement, the decision server 255 accepts hypertext transfer protocol (HTTP) requests for advertisements and returns an extended markup language (XML) document which provides URL's for the statically encoded content which should be inserted into the Content stream. It will be appreciated that, while decision server 255 is capable of serving enriched content, it may also select conventional text messaging or any desired form of messaging.

Figure 3:
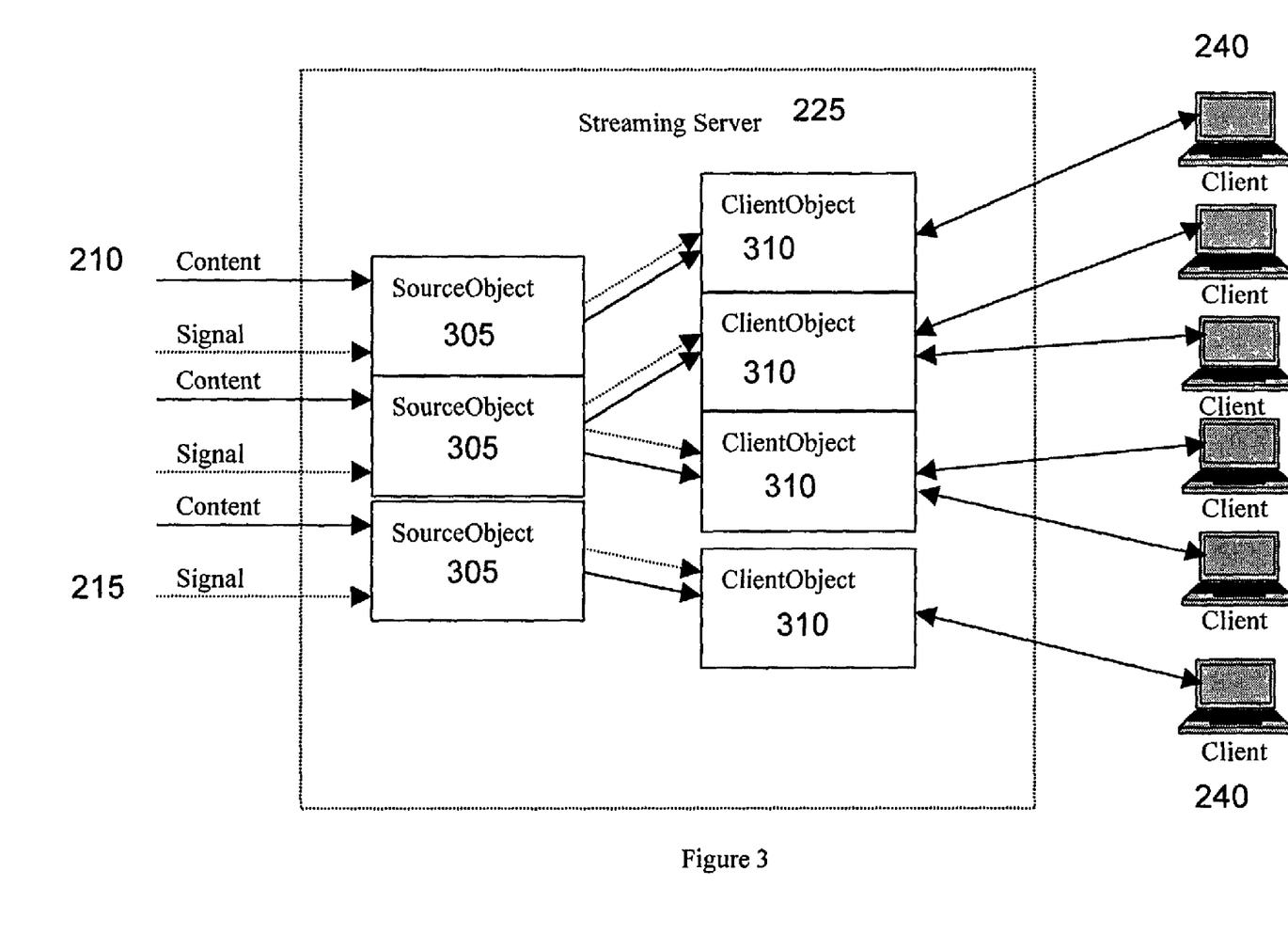
FIG. 3 illustrates in exemplary form the relationships of plugin sub-objects for use in connection with live broadcasts.

Referring next to FIG. 3, the Insertion Plugin 130 as used in the live broadcast case is shown in greater detail. In particular, the plug-in 130 is further broken down into two types of sub-objects, a SourceObject 305 and a ClientObject 310. It will be appreciated that the relationships shown in FIG. 3 between the Content sources 210 and the SourceObject objects 305 and the ClientObject objects 310 and the Clients 240 are for the Live Broadcast case and are virtual.

As shown in FIG. 3, each independent SourceObject 305 is connected with the Content 210 and control signal 215 from a single Live Broadcast stream. Each ClientObject 310 is connected to a single SourceObject 305 which provides it with the control signal 215 and Content 210 for that Live Broadcast. More than one ClientObject 310 can be connected to the same SourceObject 305. Finally, each Client 240 is connected to one of the ClientObjects 310, and more than one Client 240 can connect to the same ClientObject 310. It is important to recognize that this diagram is virtual, and could take a number of forms. For example, in the case of the implementation for the RealServer™ Streaming Server, the Insertion Plugins are implemented as Real System Architecture™ plugins. The signals coming in on the left side (from the Live Broadcast) are received by the server core. The server core then passes the signals to the SourceObject, which is implemented as a PacketSink plugin. The ClientObjects exist as Live Broadcast Plugin Objects in the Real System Architecture™. Finally, the ClientObjects in fact send the streams back through the RealServer™ Core, which handles the direct communication with the clients. In the Windows Media Services™ Streaming Server implementation, there is a Common Object Model (COM) object called a StreamSource, which corresponds to the SourceObject, and there is a group of interconnected objects, (PacketSwitch, Multiplexer, and HTTPClient) which are connected together to implement the functionality of the abovementioned ClientObject.

Figure 4:
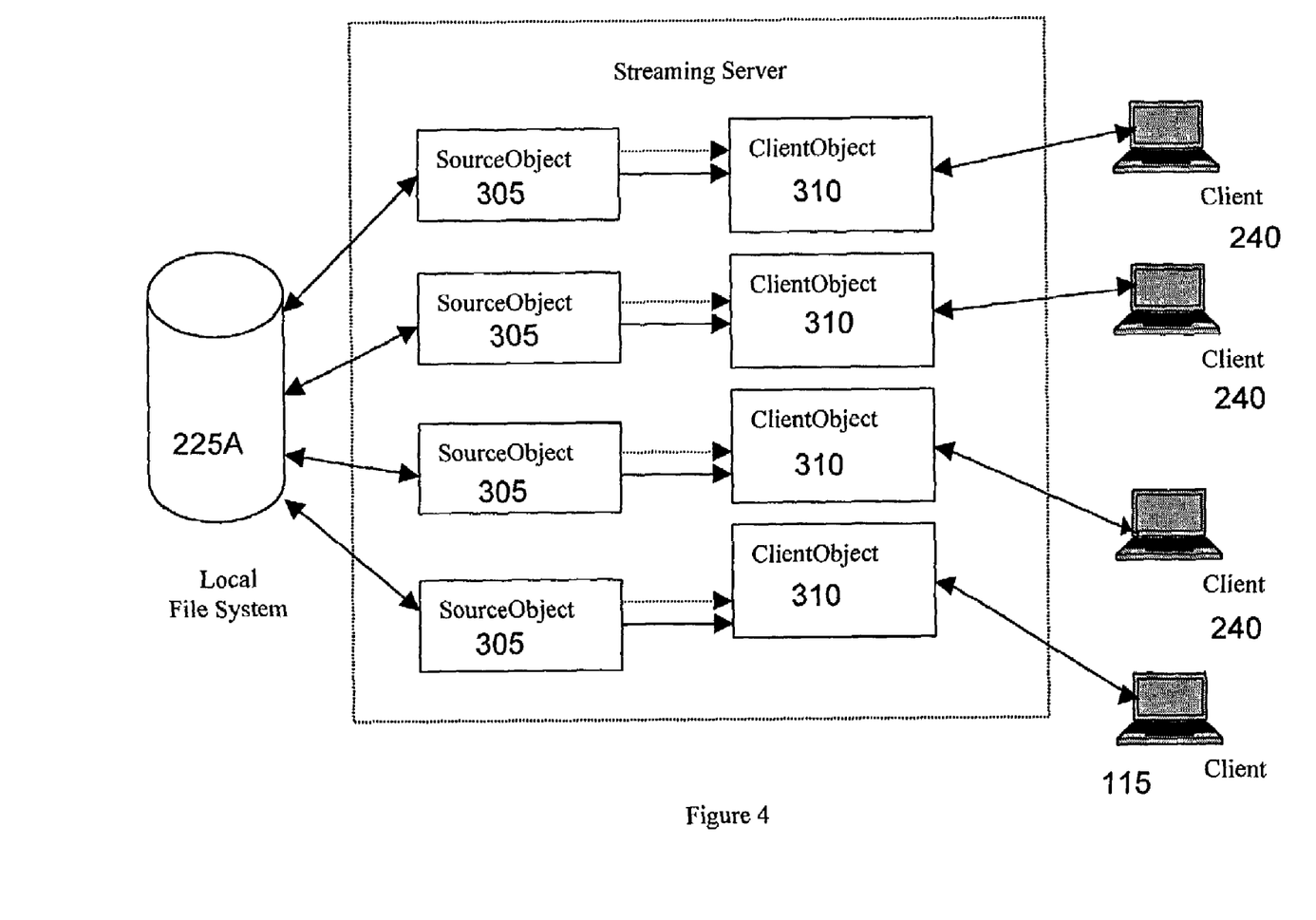
FIG. 4 illustrates in exemplary form the relationships of source objects and client objects for use in connection with on demand broadcasts.

The On Demand implementation operates somewhat differently, as can be better appreciated from FIG. 4. As mentioned previously, the On Demand context involves having a choice of content available for selection by the user at the user's selected times. As a result, there is no automation engine or encoder, and the content instead is provided by a local file system 405 maintained at an appropriate location either on the network 120 or at a content provider's server such as the decision server 255. In this arrangement, Clients 240 can connect to any piece of pre-encoded Content 210 at any time; there is no sharing which occurs between ClientObjects 310 and SourceObjects 305, or between Clients 240 and ClientObjects 310 because no data stream need be the same for more than one client. Once again, the arrangement depicted in FIG. 4 is a virtual configuration which is implemented in the framework of the particular server. In one exemplary implementation for the Real Player, the SourceObjects actually use the built in RealSystem Architecture™ Local File System Plugin, and its associated File Objects, and the File Format Plugin for the type of Content which is to be streamed to the Client. The ClientObjects in this example comprise a Real System Architecture File System Plugin and associated File Object, and a File Format Plugin. The File Format Plugin reads the XML files that constitute the playlists served to the clients. In turn, the Real Server manages the direct client connections and communications, and the actual reading of the files in which the Content is stored.

Figure 5A:
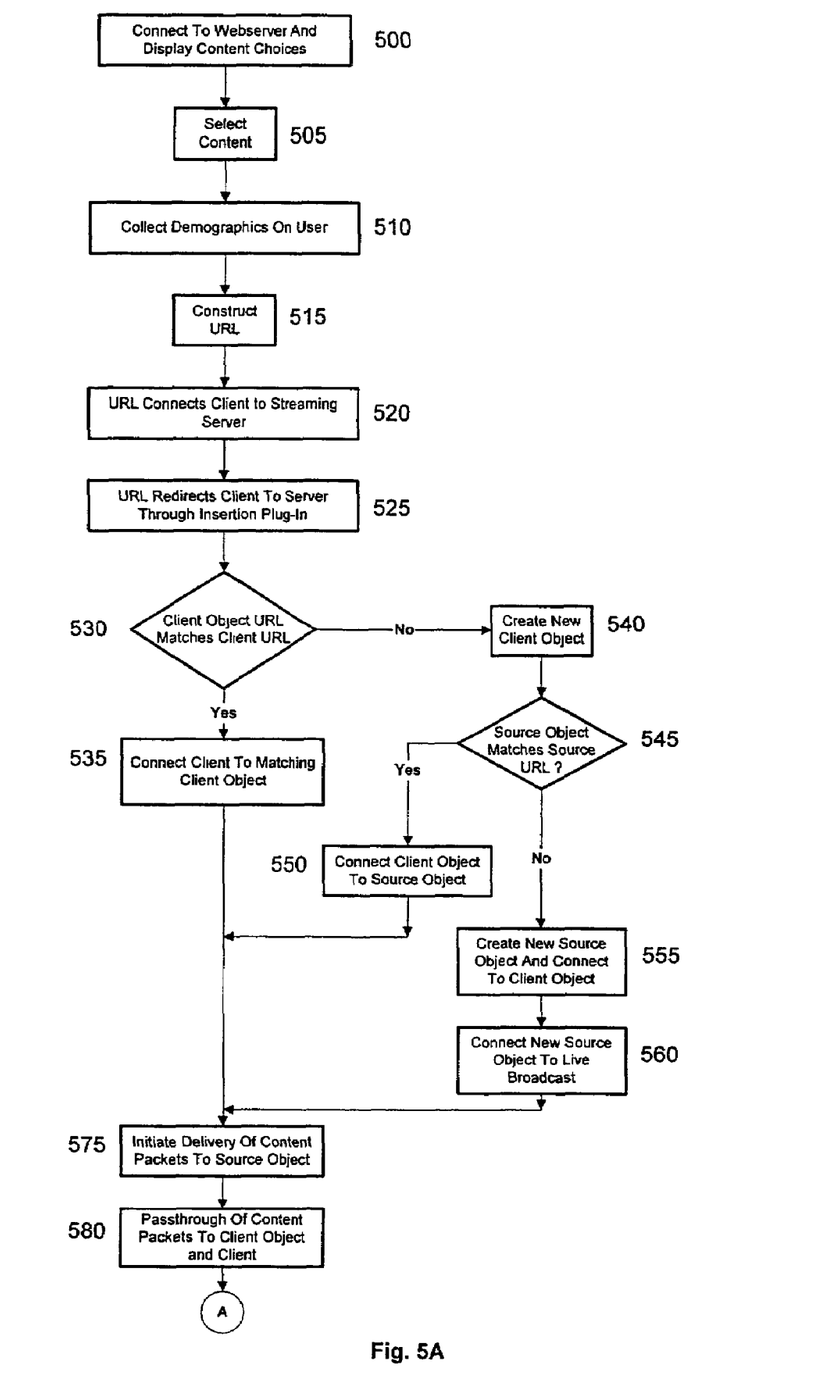
FIGS. 5A–5C illustrate in flow diagram form exemplary aspects of the content insertion method of the present invention as might be used with live broadcasts.
Figure 5B:
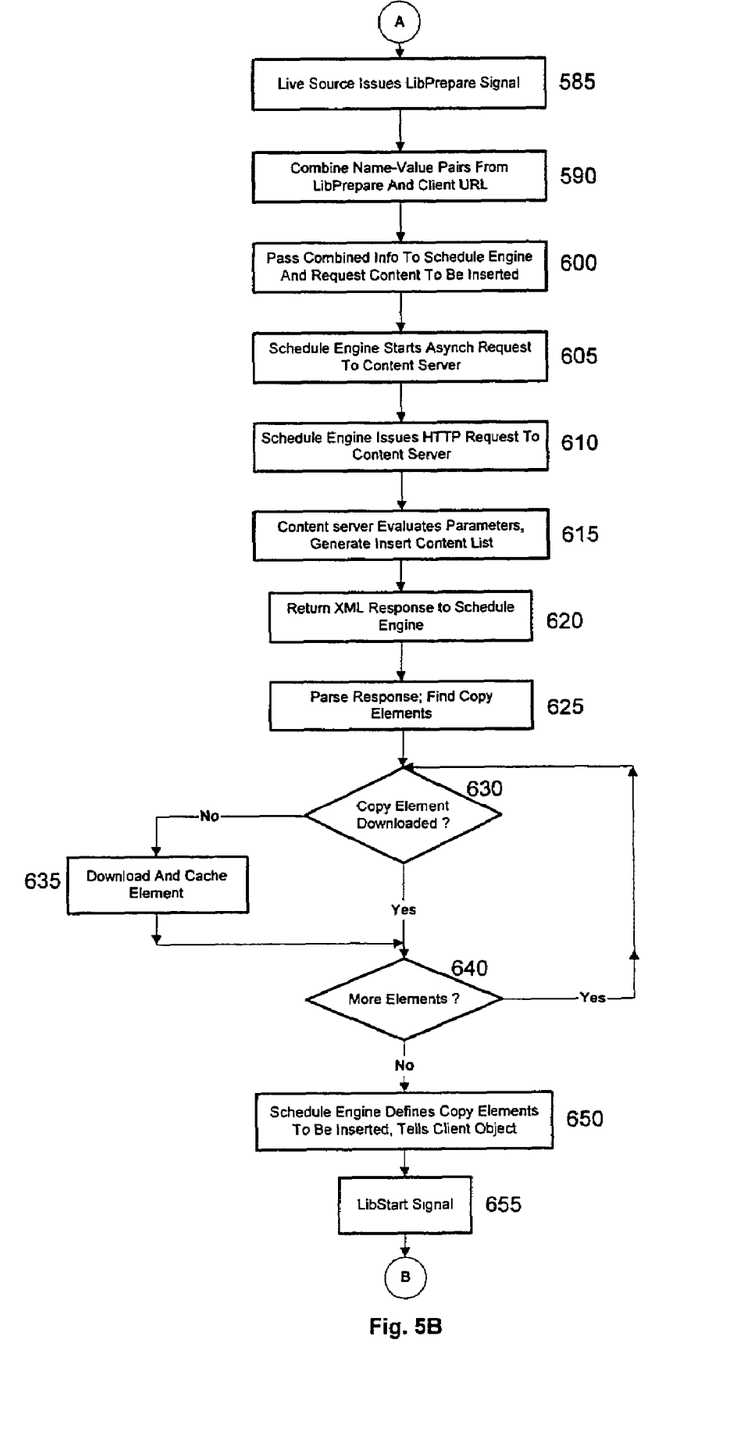
Figure 5C:
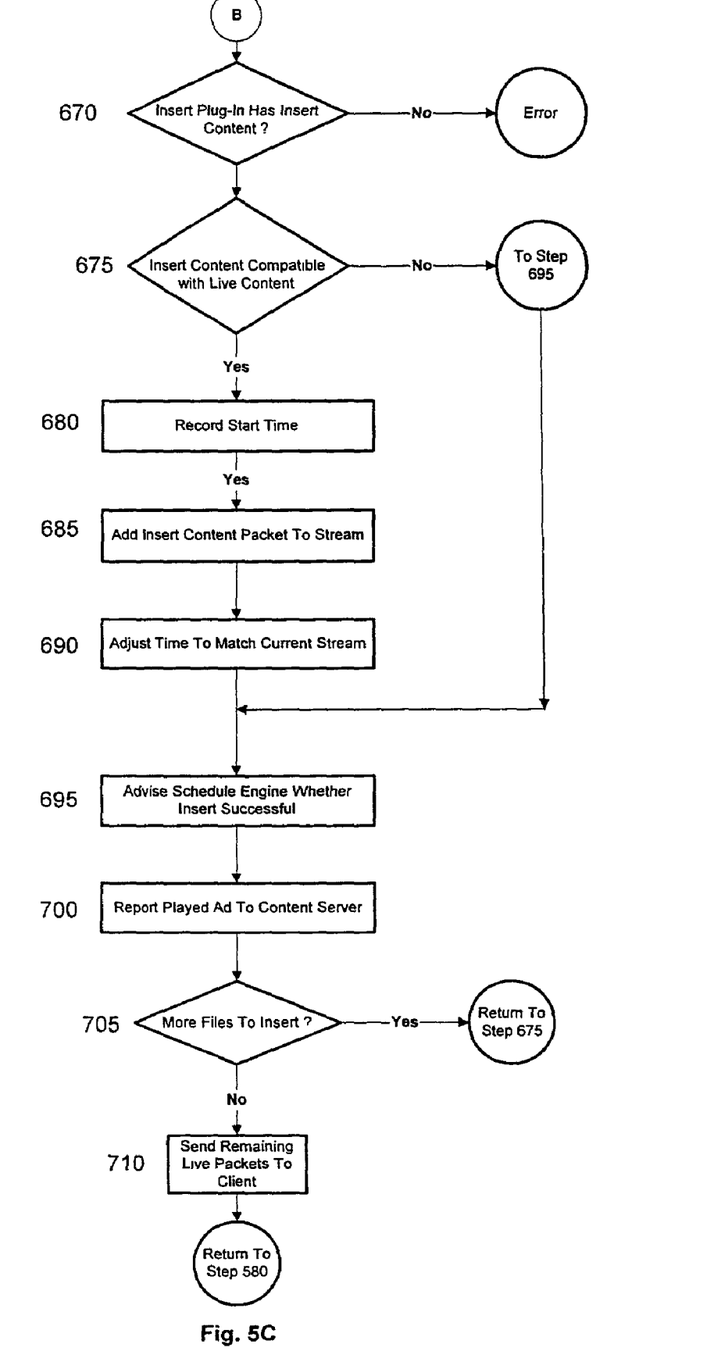

Referring next to FIG. 5, the process flow of managing insertion of rich content into a live broadcast may be better appreciated.

The process begins at step 500 with the user causing the client 240 to connect to the Web Server 245 (FIG. 2), where the user can view a web page, for example a portal site such as Yahoo which provides many services to users, that contains one or more links to content on the Streaming Server 225.

At step 505, the user clicks one of the content links on, for example, the portal site. In response, at step 510, the Web Server 245 collects any demographic or other relevant information that is available about the user, which may include geographic location, age, gender, or any other attributes or characteristics useful in targeting advertisements to the user which relate to that user's interests. Examples of sources of such information include but are not limited to commercial services which provide such information, questionnaires which are answered by the users, and tracking the user's behavior on the portal site and inferring attributes. Depending on the implementation, the data may be presented to the web server as a metafile.

Then, at step 515, the Web Server 245 constructs a URL for connecting to the stream. In an exemplary arrangement, the URL takes the general form:

<protocol>://<server>/<mount point>/<signature>/&<name1>.<value1>&<name2>. <value2>/<adserver>/<source URL>.

Thus, an example URL would be:

rtsp://radio.loudeye.com/AdInsert/Broadcast/34B278CD/&uid.1&affiliate. loudeye/A dServer.Loudeye.com/encoder/Channel1.rm It will be appreciated that the foregoing URL comprises several fields. The protocol, server and mount point fields are conventional. The signature field ensures that those connecting to the content 210 through a content provider who has selected to use the present invention also receive the additional inserted content. The <name><value> pairs are arbitrary, but are typically derived from the information about the particular user or group of users gathered in step 510. Such information may be passed to the decision server 255 [FIG. 2] to make targeting decisions. The <adserver> field identifies a valid decision server 255, and the <source> field is a URL which could be used to directly connect to the server and get the originating Content and Signals. In accordance with one aspect of the present invention, however, this direct connection is prevented by security means, so that the only access to the content is through the insertion plugins.

Following the construction of the URL by the web server 245, at step 520 the Client connects to the Streaming Server with that specified URL. In turn, as shown at step 525, the URL directs the server to connect the Client through the Insertion Plugin 130 to the <source URL>, as shown in FIG. 3. To complete that connection, at step 530 the server looks for a ClientObject 310 having a URL which matches the URL the Client 140 just connected with. If a matching URL exists, the Streaming Server 225 connects the Client 140 to that ClientObject 310 at step 535, and the process jumps to step 575, discussed below.

However, if the check at step 530 reveals that there is no ClientObject 310 which matches the URL, then a new ClientObject 310' is created at step 540. At step 545 of the process, the new ClientObject 310' checks to see if there is an existing SourceObject 305 which matches the <source URL>. If one exists, then at step 550 the ClientObject 310' connects to the SourceObject 305 and the process advances to step 575, discussed below. If the check at step 545 shows there is no SourceObject 305 which matches the <source URL>, then a new SourceObject 305' is created at step 555 and the ClientObject 310' is connected to it.

If a new SourceObject 305' was created, at step 560 it attempts to connect to the Live Broadcast Content 210 and control signals 215 defined by the <source URL>. When the new SourceObject 305' succeeds or fails in the attempt to connect, it notifies the ClientObject. If the attempt to connect fails (due to non-existent source content, for example) an error is sent to the client player, it is disconnected from the server, and any unused Source and Client Objects are deleted. In most instances, the attempt to connect will succeed, at which point the process will advance to step 575.

Whether or not a new ClientObject 310' or a new SourceObject 305' had to be created and then connected to the content signal 210, the successful connection of the user to the content signal 210 will cause packets to begin to be delivered as shown at step 575.

As each of the packets is delivered to the SourceObject 305 at step 575, it gets passed on to the ClientObject, and the ClientObject in turn passes it on to the Client, as shown at step 580. These passthroughs happen without any modification to the stream.

Eventually, as shown at step 585, the Live Source 205 will send a control signal LibPrepare (shown at 217 in FIG. 2), which in an exemplary arrangement will be of the form
"~AdSignal~LibPrepare;
Length=<milliseconds>&<name>=<value>& . . . "

This signals an impending break, and initiates several events important to the insertion system of the present invention. It will be appreciated that the fields of the LibPrepare signal typically include a length and one or more fields for <name>=<value> pairs. All of the information following the ";" in the syntax of the LibPrepare signal will be included in the request to the decision server when the request is made.

In an exemplary arrangement, when the LibPrepare signal 217 reaches each of the ClientObjects 310 [after passing through the connected SourceObject], then at step 590 the ClientObject combines all of the information from the LibPrepare signal 217 following the ";" with all of the <name>=<value> pairs which were derived from the URL the Client used to connect to the Streaming Server 225 at step 515, and any <name>=<value> pairs which were sent through the Live Source's presentation header. The combined information, along with the logical name of the decision server 255 (obtained from the URL) is passed into a GetAds() request to the Schedule Engine 250 (FIG. 2) at step 600.

At step 605, the Schedule Engine 250 starts an asynchronous request to the decision server 255 and returns from the GetAds() call. In the mean time, the Insertion Plugin 130 continues to process packets normally. At step 610, the decision server 255 receives the HTTP request from the Schedule Engine 250, evaluates all of the parameters and attributes passed in, and at step 615 selects a list of static content to insert into the LIB. At step 620, the list is passed back in the form of an XML response, with an exemplary XML Document Type Declaration (DTD) shown below:

<!ELEMENT ContentList (Content+)>
<!ELEMENT Content (Copy,Banner?)>
<!ELEMENT Copy (URL,Title?,Artist?,Copyright?,ImplD?)>
<!ELEMENT URL (#PCDATA)>
<!ELEMENT Title (#PCDATA)>
<!ELEMENT Artist (#PCDATA)>
<!ELEMENT Copyright (#PCDATA)>
<!ELEMENT ImplD (#PCDATA)>
<!ELEMENT Banner (#PCDATA)>

After the Schedule Engine 250 receives the XML response from the Server 255, at step 625 it parses the response and finds all of the "Copy" elements (the URL links to the content to be inserted) as defined in the DTD. For each one of the Copy elements, at step 630 it checks to see if it has already downloaded that Copy. If it has, it goes on to the next one, otherwise at step 635 it downloads the Copy and caches it on a local storage device for the Streaming Server where the Insertion Plugin resides.

Once all of the Copy has been successfully downloaded, or failures have occurred, at step 650 the Schedule Engine calls the GotAds() notification on the ClientObject 310 to notify it what content should be inserted into that Client's stream. Some short time later, as shown at step 655, the Live Source 205 will send a LibStart signal 218 of the form ~AdSignal~LibStart; This signal means that it is time for the LIB to begin.

As shown at step 670, upon receiving the LibStart signal, the Insertion Plugin 130 checks that it has received a list of content to insert and that there have been no errors. If so, then it begins inserting the local file packets into the stream as follows:

First, as shown at step 675, it checks for compatibility between the encoded content in the file and the Live Source encoded Content. If there is not a match, then the process jumps to step 695; but in most cases a match will exist and the process advances to step 680, where the start time from the Live Source packets is recorded. As shown at step 685, for each Live Source packet which arrives, a request is made to read packets from the local file to be inserted and the Live Source packet is held in a queue.

At step 690, when a local file packet is successfully read, the time is adjusted to match the current stream time (discussed further in connection with FIG. 7, below), and any corresponding packets from the Live Source stream are removed from the queue and discarded. Then, after the complete file has been inserted in this manner, the PlayedAdo method of the Schedule Engine is called to inform the Ad Server that a particular ad was successfully inserted or not, all as shown at step 695.

In the background, as shown at step 700, the Schedule Engine will report the PlayedAd() call to the server 255 via an HTTP request, after which at step 705 a determination is made that there are more files to insert. If so, the Ad Insertion Plugin will return to step 675 if there are more files to insert. If there are no more files to insert, then any remaining packets in the queue from the Live Source stream are sent to the Client at step 710, and normal passing of the Live Source stream packets is resumed, which essentially returns the process to step 580. The process then resets and continues until further control signals [e.g., another LibPrepare signal 217] are received from the Live Source 205.

The LibEnd signal 219 (FIG. 2) which identifies the end of the LIB may be used to terminate the insertion process early, if the content to be inserted exceeds the length of the LIB. Alternatively, the plugin may insert all of the content identified by the plugin.

It will be appreciated that one aspect of the invention is the ability to accurately report, to advertisers or others, the number of times the rich content has been displayed to the universe of users. This permits advertisers and others to monitor campaigns, revise content to verify response, and otherwise to ensure a high return on investment. In addition, because the number of times a particular item of rich content has been displayed can be accurately monitored, pricing schemes can be based on actual performance, rather than predicted audiences as it typical with conventional broadcast media.

Figure 6A:
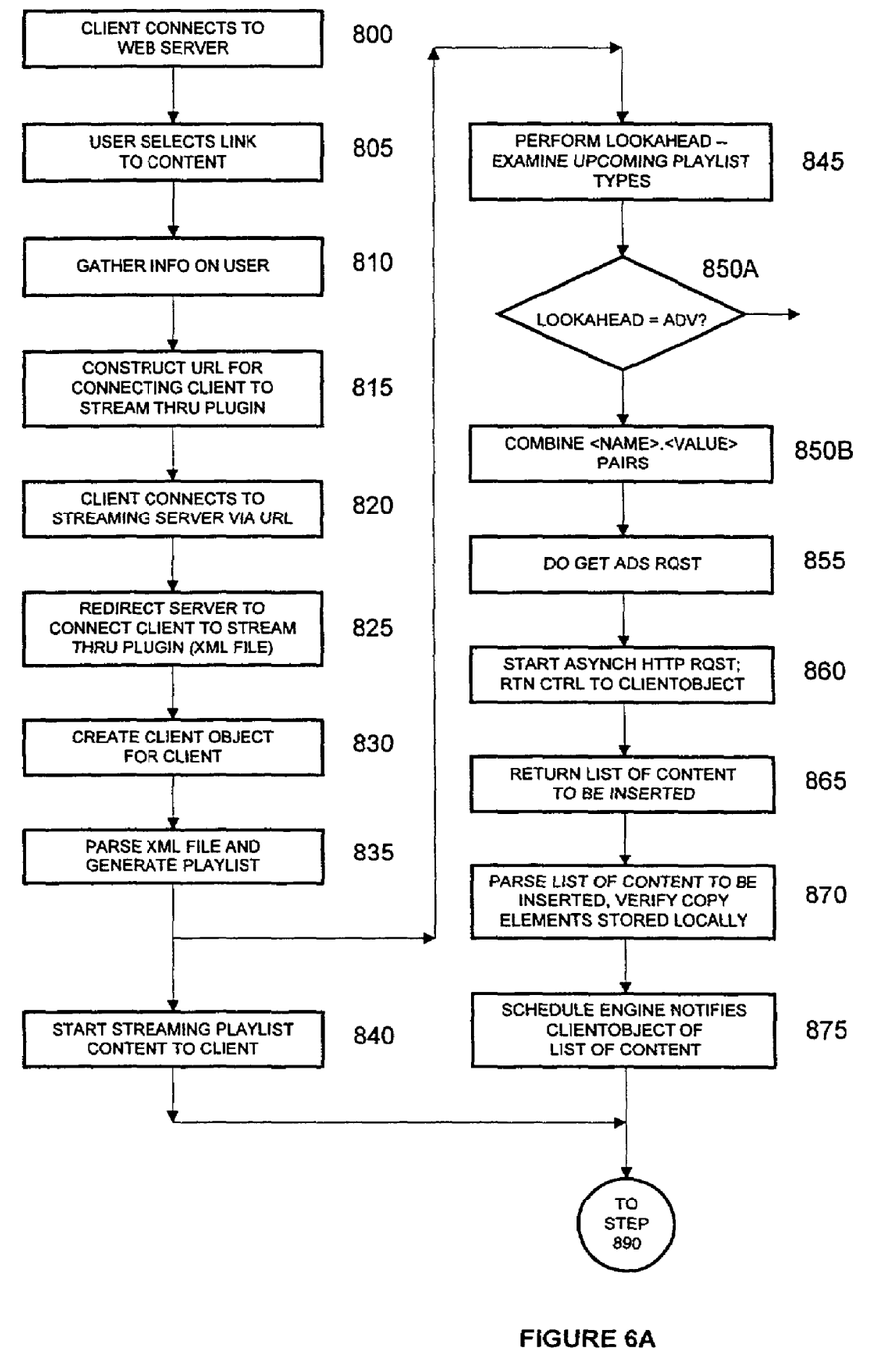
FIG. 6A–6B illustrates in flow diagram form exemplary aspects of the content insertion method of the present invention as might be used with on demand broadcasts.
Figure 6B:
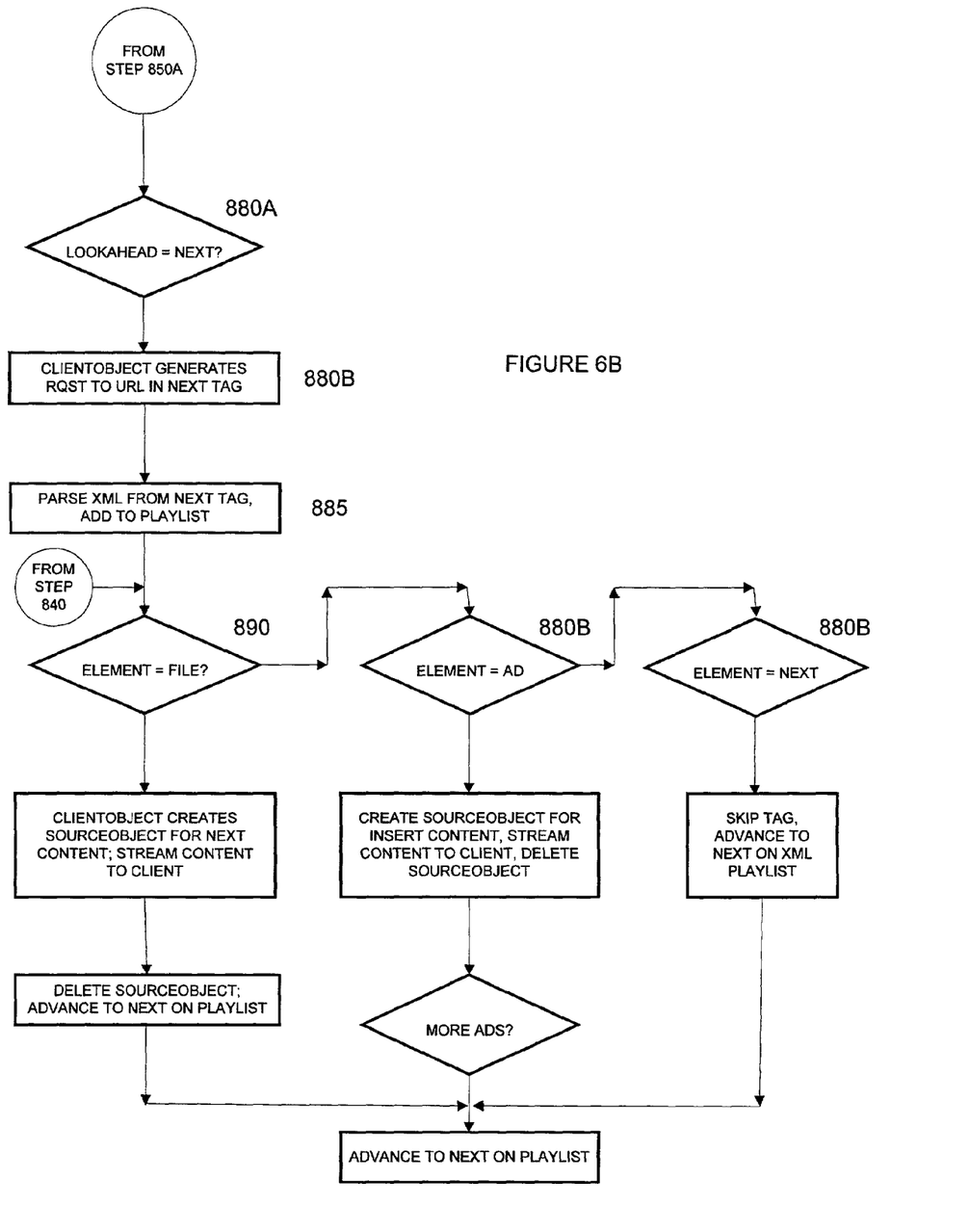

While the foregoing has described the insertion of content into a live broadcast, the insertion of content into an on demand broadcast is somewhat different, and can be better appreciated with reference to the process flow diagram of FIG. 6. As noted previously, no Live Source 205 exists in the on demand context, and therefore no encoder 115 is typically required. Instead, the Content is pre-recorded and generally pre-encoded into the format which is used for streaming.

In such an arrangement, at step 800 the client 240 [shown in FIG. 2] connects to the Web Server 245 and views a web page which contains a link to the Streaming Server with specific information about connecting to the particular content which the user is interested in viewing. At step 805, the user clicks on the link, which causes the Web Server to collect any information that is available about the user as shown at step 810. As with the live broadcast context, this information may include geographic location, age, gender, and any other attributes or characteristics which may be used to select advertisements or other rich content for delivery to the user.

Then, at step 815, the Web Server 245 constructs a URL for connecting to the stream; in an exemplary arrangement, the URL takes the form:
<protocol>://<server>/<mount point>/<signature>/&<name1>.<value1>&<name2>.<value2>/<adserver>/<source URL>.

An example URL would be:
rtsp://radio.loudeye.com/AdInsert/OnDemand/34B278CD/&uid.1&affiliate.loudeye/AdServer.Loudeye.com/encoder/playlist.asi As with the URL generated for the Live Broadcast context, the URL can be seen to comprise a series of fields and, except for the source URL, each of the fields operates the same as the corresponding field described above for the live broadcast context. In the on demand context, the source URL is a URL which identifies an XML playlist file on the streaming server, as discussed below.

Then, at step 820, the Client 240 connects to the Streaming Server 225 with the specified URL, and at step 825 the URL directs the server to connect the Client through the Insertion Plugin to the <source URL>, as shown in FIG. 2. Specifically, the <source URL> specifies an XML file. The Document Type Declaration for the XML file is shown below:
    <!ELEMENT PlayList (CodecInfo?,(File?,Advertisement?, Next?)+)>
    <!ELEMENT CodecInfo (#PCDATA)>
    <!ELEMENT File (Name,StartTime?,EndTime?)>
    <!ELEMENT Advertisement (Length,AdParameter*)>
    <!ELEMENT Next (#PCDATA)>
    <!ELEMENT Name (#PCDATA)>
    <!ELEMENT StartTime (#PCDATA)>
    <!ELEMENT EndTime (#PCDATA)>
    <!ELEMENT Length (#PCDATA)>
    <!ELEMENT AdParameter (AdSlot? |Promo? |Jingle?)>
    <!ELEMENT AdSlot (#PCDATA)>
    <!ELEMENT Promo (#PCDATA)>
    <!ELEMENT Jingle (#PCDATA)>

Next, at step 830, a ClientObject 310 [FIG. 4] is created for the Client. The ClientObject 310 parses the XML file at step 835 and keeps the contents in memory as a PlayList. Note that the PlayList can contain different types of items to play, or execute, among which can be:
    a. File—play the local pre-recorded file starting and ending at the times specified.
    b. Advertisement—request rich content given the AdParameters which are part of the Advertisement element.
    c. Next—make an HTTP request to the URL passed in the Next tag. The HTTP Server will return another XML document with the same format as specified in step 4. The ClientObject will parse the new XML file and continue playing the PlayList in that file.

Then, after parsing the file, at step 840, the ClientObject waits until it has a predetermined number of pieces of Content (for example two although this can vary over a wide range depending on the implementation) to play before it starts playing the stream to the Client. For example, if the first entry in the PlayList is an advertisement, the ClientObject will wait until the advertisement is successfully downloaded before starting the stream. As shown at step 845, the ClientObject will also perform a look ahead in the list and make requests which will take time to fulfill (Advertisement and Next) before it is time to play those elements, to ensure that all elements of the on demand broadcast are available when required.

If the lookahead element is an Advertisement tag, then at step 850 the ClientObject will combine all of the <name>=<value> pairs from the URL used to connect to the Streaming Server, along with the <name>=<value> pairs from the Advertisement tag and, at step 855, do a GetAds( ) request to the Schedule Engine, similarly to the operation of the live broadcast context. Then, at step 860, the Schedule Engine will start an asynchronous HTTP request to the decision server 255 and return control to the ClientObject so that the streaming is not interrupted.

Once the decision server receives the asynchronous HTTP request, it processes all of the parameters and attributes in the request and selects advertisements or other content to insert into the stream. More specifically, at step 865 the Ad Server returns the list of content in the form of an XML document as specified above in the discussion of Live Broadcast. Then, at step 870, the Schedule Engine parses the list of content to insert, checks that each of pieces of Copy has been cached on the local disk, and downloads those pieces which have not been cached from the appropriate Content Web Server, and at step 875, the Schedule Engine then notifies the ClientObject of the list of content to insert.

If the lookahead element is a Next tag, however, the ClientObject initiates an HTTP request to the URL specified in the Next tag as shown at step 880. The request is asynchronous, so the ClientObject can continue to send the stream to the Client while the request is pending. When the request completes, at step 885 the ClientObject parses the XML document which it receives and adds the contents to the end of the current PlayList which resides in memory.

While the lookahead function is processing asynchronously, the playlist continues to play the next element. If the element is a file, at step 890 the ClientObject creates a SourceObject which points to the pre-recorded Content specified in the File tag. The ClientObject then streams the packets to the Client at step 895. Once the file has completely been played, the ClientObject deletes the SourceObject as shown at 900, and goes on to the next item in the PlayList, as shown at step 905.

If the element is an Advertisement, the ClientObject will create a SourceObject which points to the cached pre-recorded file for that advertisement which was determined by the decision server 255. The ClientObject will then stream the packets to the client until the advertisement is complete. It will then delete the SourceObject and check if there are any more advertisements in the list received from the Ad Server. If there are more, the process loops until there are no more ads to play, after which the next element in the PlayList is played as shown at step 905.

If the element is a Next tag, then, as shown at step 920, the ClientObject simply skips the tag and continues on to the next element in the in memory PlayList, which is the first element of the XML document received from the request to the URL specified in the Next tag, as discussed above at step 880.

As with the Live Broadcast model, it will be appreciated that the number of times a particular item of content has been inserted into stream can be monitored accurately, with the attendant benefits and advantages discussed above.

Figure 7:
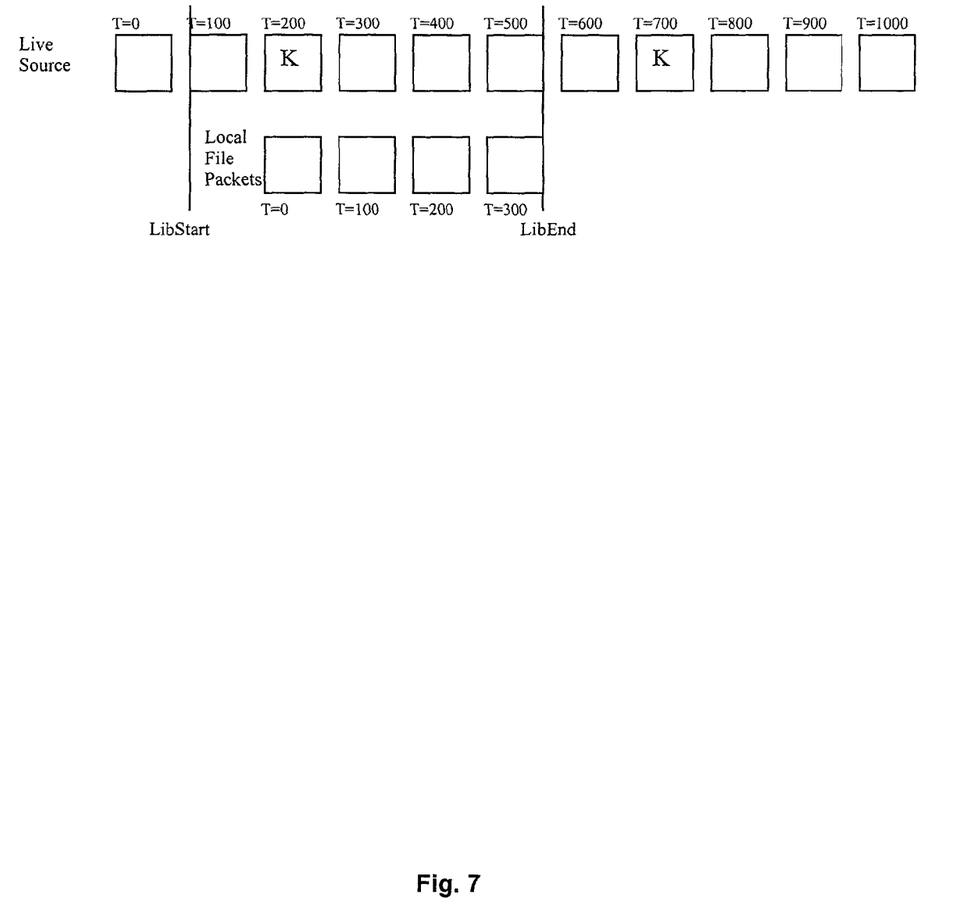
FIG. 7 illustrates in time line form the adjustment of time in the live broadcast implementation.

Referring next to FIG. 7, another aspect of the present invention may be better appreciated. The Live Broadcast insertion case was discussed above in connection with FIG. 5. In that example, the Live Source packets are being transmitted as shown in FIG. 7. Note that each packet has a timestamp associated with it, and the timestamps increase over time. At time T=100, the LibStart signal occurs, which signifies that an insertion should begin. Assuming that a LibPrepare signal was received and content was successfully selected and cached on the Streaming Server, the Ad Insertion Plugin has a local file which it can insert. The local file packets have an initial time which may or may not be 0. If it is not 0, an offset is determined and subtracted from the timestamp associated with each packet so that it is effectively 0. The Ad Insertion Plugin makes note of the LibStart signal and observes each subsequent packet to determine if it is a KeyFrame packet. Upon occurrence of a KeyFrame packet, the Ad Insertion Plugin begins the insertion. As each Live Source packet is received, it is discarded and a packet from the Local File is time adjusted to match the time of the packet which was discarded. In this example, the KeyFrame packet occurs a t=200, so an offset of 200 is added to the time of each Local File packet before it is inserted in the stream. This process continues until the Local File packets are exhausted, or until a LibEnd is received. While KeyFrames were assumed in the prior example, some streams do not have KeyFrames. In that simple case every packet can be considered a KeyFrame packet, such that the content insertion begins immediately.

Although the above discussion is limited to insertion of a single local file, it is a straightforward generalization to insert multiple Local Files into a single Local Insertion Break. This is done by opening the next Local File when an insertion of one is finished. Then the time offset is readjusted in a similar manner.

Similarly, the above example assumes that the packets are a constant time length. This can be generalized by finding the time adjustment, as above, but discarding packets based on time, rather than in a straight packet for packet fashion. The inserted packets in this case will not exactly match the total time for the stream packets discarded. The packets should be discarded in a way such that the minimum time error is committed for each insertion.

Finally, the foregoing example illustrates the operation for a single stream of multimedia packets, although in some embodiments multiple streams may exist. This more generalized case, involving multiple streams of packets, is handled on a stream by stream basis, as described above.

One unique feature of the server side insertion technique of the present invention is that the insertion occurs in the compressed and already encoded stream, although not required in every implementation. The aforementioned technique could be applied to uncompressed media streams as well.

Figure 8:
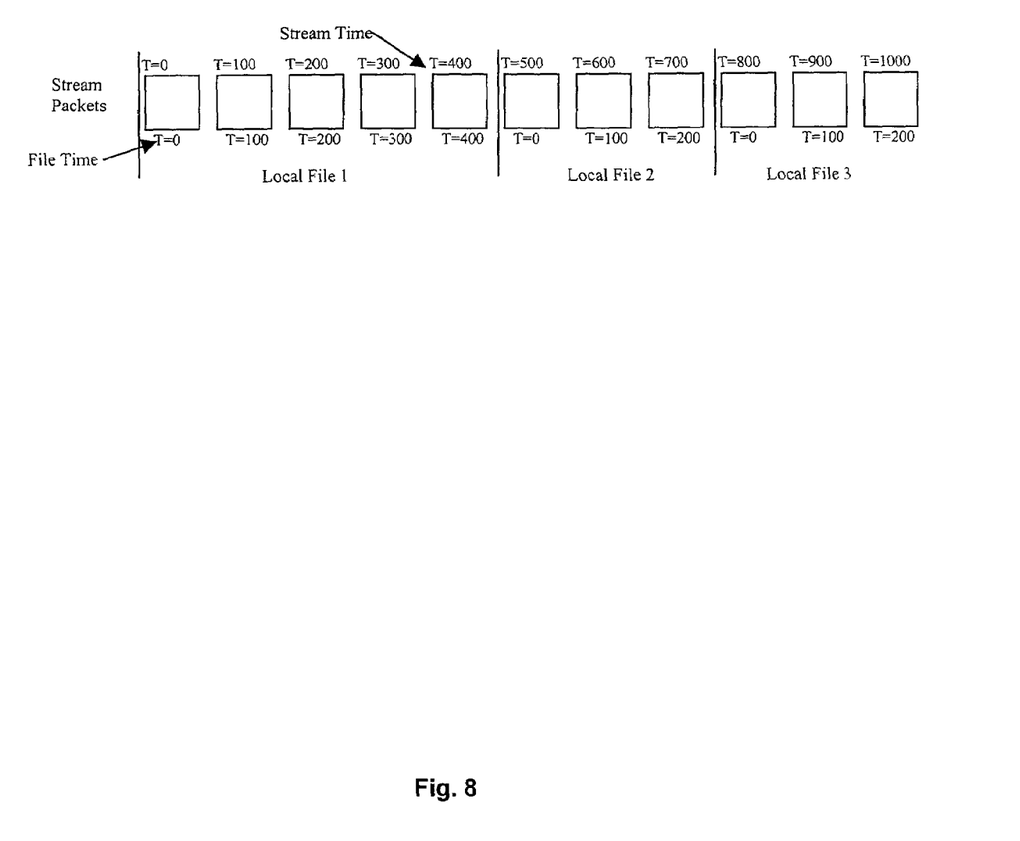
FIG. 8 illustrates in time line form the adjustment of time in the on demand broadcast implementation.

Referring next to FIG. 8, adjustment of time in the on demand case may be better appreciated. An XML file is used to determine which local files to play. Because all of the tags (File, Advertisement, Next) eventually resolve to a local file, the insertion then can simply be described in terms of Local Files. When a client connects to the On-Demand Ad Insertion Plugin, the plugin reads the first file resolved from the playlist and uses the headers of that file as the headers for the stream. Adjustments to the headers may be made to account for header properties which are specific to that particular file, such as stream duration. It then reads each of the packets from the file and streams them to the client in real time (i.e. in the above case, since each packet is 100 ms long, it would send 10 packets per second to the client). When it has completed the first Local File, it opens the next local file, selects a time offset based on the current Stream Time (the upper times in FIG. 8) and adds it to each of the packets in the file as it streams them to the client. This process continues until there are no more files to send, at which time a signal is sent to the client that the stream is complete.

In the exemplary case described above, the individual files are used to generate one continuous stream which appears to the client as if it were a live broadcast. There are two consequences to this: 1) the user never has a direct link to the content being streamed, which provides security so that the user cannot gain direct access to the content; and 2) there is no rebuffering (delays which cause the rendering to stop on the client—a gap in the audio, for instance) which results in a better experience for the user. As with the live broadcast case, the insertion occurs on the server side in the compressed (already encoded) stream, but could be applied to uncompressed media streams as well.

In the foregoing discussion of content insertion, it is assumed that there are existing streams which are being replaced with a Local File, or Local Files of media which are being streamed sequentially. There are certain cases where this technology can be used to generate synchronized multimedia streams as well. One example of this is URL Events. These streams are typically used to trigger the player to open up a web page. For example, it is possible to manufacture a URL Event stream so that URL Event packets are sent to the client along with the audio packets. When a content insertion starts, a URL Event is manufactured, which causes the client player to open up a web page (possibly an image which has a picture of the product being promoted in the audio advertisement) which is synchronized with the start of the audio advertisement. This results in a rich experience for the user, and a better chance of users responding to the advertisements or other inserted content. It is also to be noted that the ability of the present invention to synthesize mutlimedia streams is not limited to URL events.

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. A method for server side insertion of content into streaming media including the steps of
    providing a streaming server;
    associating an insertion plugin with the streaming server;
    generating a command which includes indicia for locating content desired by a user and indicia for locating a source for content to be inserted; and
    removing and replacing by the insertion plugin, in response to a signal associated with the content desired by the user, packets of content to be inserted for packets of the content desired by the user without requiring a re-buffering between the packets of content to be inserted and the content desired by the user; and
    adjusting the time of at least one packet of content to be inserted to match the time of at least one substituted packet of content desired by the user,
    wherein the substituting step is carried out an edge server.

2. The method of claim 1 wherein the generated command further includes indicia reflective of the user.

3. A method for matching the timing of content inserted into a data stream with breaks in the data stream comprising:
    prefetching the content to be inserted into the data stream;
    storing the prefetched content on a local server;
    identifying a starting point for a break in the data stream;
    establishing an offset between the starting point of the break and an initial packet of the prefetched content, the offset being subtracted from a timestamp associated with the initial packet of the prefetched content;
    removing from the data stream packets corresponding to a length of the break;
    inserting the prefetched packets into the data stream to replace the removed packets without requiring a re-buffering between the prefetched packets and the data stream; and
    adjusting the time of at least one inserted packet to match the time of at least one removed packet,
    wherein the establishing and inserting steps are carried out at an edge server.

4. The method of claim 3 further including adjusting the time of a plurality of inserted packets to match the time of a plurality of removed packets.

5. The method of claim 3 wherein the data stream is a live broadcast.

6. The method of claim 3 wherein the data stream is an on demand broadcast.

7. The method of claim 1 wherein the location of the content desired by the user is identified by a URL.

8. The method of claim 1 wherein the location of the content desired by the user is defined by a network address.

9. The method of claim 1 wherein the location of the content desired by the user is identified by an XML playlist.

10. A system for inserting content into streaming media comprising
    a streaming server for receiving content in the form of streaming media and passing it to a client;
    an insertion plugin associated with the streaming server for redirecting the streaming media and capable of recognizing an impending break in a media stream, wherein the insertion plugin is located at a server side;
    a source of content to be inserted proximate to the streaming server;
    a decision server responsive to the impending break in the media stream for directing the insertion of content from the source of content to be inserted into the media stream for substantially the duration of the break, wherein data packets of the content received from the streaming server that corresponds to a length of the break are removed and are replaced by the content to be inserted by the insertion plugin without requiring a re-buffering between the media stream and the content to be inserted; and
    a schedule engine providing an interface between the insertion plugin and the decision server for making a request to the decision server, receiving and parsing a playlist file from the decision server, and downloading content associated with the playlist file.

11. The system of claim 10 further including a counter for identifying the number of times a universe of users sees a particular item of inserted content.

12. The method of claim 10, wherein the playlist file contains at least one of a local pre-recorded file, an advertisement, and a next request that are different types of items to be played.

13. The method of claim 1, wherein the substituting is based on a playlist file on the streaming server determined by a decision server.

* * * * *